United States Patent

Kercheck et al.

[11] Patent Number: 5,329,452
[45] Date of Patent: Jul. 12, 1994

[54] CROSSTALK COMPENSATION IN WHEEL ALIGNMENT SYSTEM

[75] Inventors: Gary R. Kercheck, Milwaukee; Peter A. Peutz, Waukesha, both of Wis.

[73] Assignee: SPX Corporation, Muskegon, Mich.

[21] Appl. No.: 748,842

[22] Filed: Aug. 23, 1991

[51] Int. Cl.⁵ .............................. G06F 15/20
[52] U.S. Cl. .................. 364/424.05; 364/550; 364/559; 33/203.12; 33/203.18
[58] Field of Search ......... 364/424.05, 203.18, 364/551, 424.03, 559; 33/18, 288, 228; 356/152, 155, 550

[56] References Cited

U.S. PATENT DOCUMENTS

| | | | |
|---|---|---|---|
| 4,180,915 | 1/1980 | Lill et al. | 33/228 |
| 4,192,074 | 3/1980 | Chang | 33/228 |
| 4,381,548 | 4/1983 | Grossman et al. | 364/551 |
| 4,500,201 | 2/1985 | Lill | 356/152 |
| 4,594,789 | 6/1986 | Marino et al. | 33/288 |
| 5,014,227 | 5/1991 | Kling et al. | 364/559 |
| 5,018,853 | 5/1991 | Hechel et al. | 356/155 |
| 5,029,395 | 7/1991 | Breuer et al. | 33/203.18 |
| 5,052,111 | 10/1991 | Carter et al. | 33/203.18 |
| 5,056,233 | 10/1991 | Hechel et al. | 33/288 |
| 5,104,227 | 5/1991 | Kling et al. | 364/559 |

FOREIGN PATENT DOCUMENTS

| | | |
|---|---|---|
| 0015826A1 | 2/1980 | European Pat. Off. . |
| 0460471A2 | 5/1991 | European Pat. Off. . |
| 2403542 | 9/1978 | France . |

Primary Examiner—Thomas G. Black
Assistant Examiner—Tan Q. Nguyen
Attorney, Agent, or Firm—Kinney & Lange

[57] ABSTRACT

A wheel alignment system measures true camber and true pitch. Camber and pitch angles are measured using a head unit coupled to the wheel of the automotive vehicle. True camber and true pitch are calculated based upon measured camber and measured pitch, a camber crosstalk value, and a pitch crosstalk value.

15 Claims, 5 Drawing Sheets

CROSSTALK COMPENSATION IN WHEEL ALIGNMENT SYSTEM

BACKGROUND OF THE INVENTION

The present invention relates to a wheel alignment technique. In particular, the present invention relates to measurement of camber and pitch in a wheel alignment system.

Proper alignment of the wheels of an automotive vehicle is important for proper handling of the vehicle and proper tire wear. In addition, proper alignment of the wheels will decrease fuel consumption as well as increase vehicle safety. The wheel alignment parameters which are measured and adjusted in order to achieve proper wheel alignment are camber, caster, steering axis inclination (SAI) and toe.

Camber angle is the inclination of the wheel plane with respect to vertical. It is considered positive when the wheel leans outward at the top, and is considered negative when it leans inward. Any wheel of an automobile can have camber.

Caster angle is the angle in side elevation between the steering axis of a steerable wheel (typically one of the front wheels) with respect to vertical. It is considered positive when the steering axis is inclined rearward (in the upward direction) and negative when the steering axis is inclined forward.

Steering axis inclination (SAI) or king pin inclination is the angle in the front elevation between the steering axis and vertical.

The static toe angle of a wheel, at a specified wheel load or relative position of the wheel center with respect to the sprung mass, is the angle between a longitudinal axis of the vehicle and the line of intersection of the wheel plane and the road surface. The wheel is "toed-in" if the forward portion of the wheel is turned toward a central longitudinal axis of the vehicle, and "toed-out" if turned away.

Camber, caster and SAI are typically measured using inclinometers attached to the wheel. With camber, the inclinometer measures the angle that the plane of the wheel makes with the vertical. To measure caster, the wheel is turned through an arc, and the difference in the camber readings is used to derive the caster value. SAI is measured in a manner similar to caster, except that the inclinometer used for the SAI reading measures the change in pitch angle of a line in the plane of the wheel as the wheel is turned through an arc. The SAI measuring inclinometer is aligned at 90° to the inclinometer used for reading camber and caster.

Alignment systems can also use the pitch angle (inclination angle) of head units in calculation of alignment angles. This is described in U.S. Pat. No. 5,014,227 entitled CASTER AND STEERING AXIS INCLINATION MEASUREMENT TECHNIQUE, which is incorporated herein by reference.

In prior art alignment systems, camber and pitch sensors must be individually aligned for each head unit. Improper sensor alignment is an additional error source. Errors in measured caster and measured pitch can prevent proper wheel alignment. A wheel alignment system which improves accuracy in wheel alignment measurements would be an important contribution to the art.

SUMMARY OF THE INVENTION

The present invention is a method and apparatus for eliminating crosstalk between pitch and camber angles in inclinometer measurements for an automotive vehicle wheel alignment system. In the present invention, head units are mounted to the wheels of an automobile. Pitch and camber angle measurements are taken. True camber angle is calculated using measured camber, measured pitch and a camber crosstalk correction factor. True pitch is calculated using measured pitch, measured camber and pitch and crosstalk correction factors. Wheels of the automotive vehicle are aligned based upon true camber and true pitch values.

BRIEF DESCRIPTION OF THE DRAWINGS

FIG. 2 which comprises

DETAILED DESCRIPTION OF THE PREFERRED EMBODIMENTS

Figure 1:
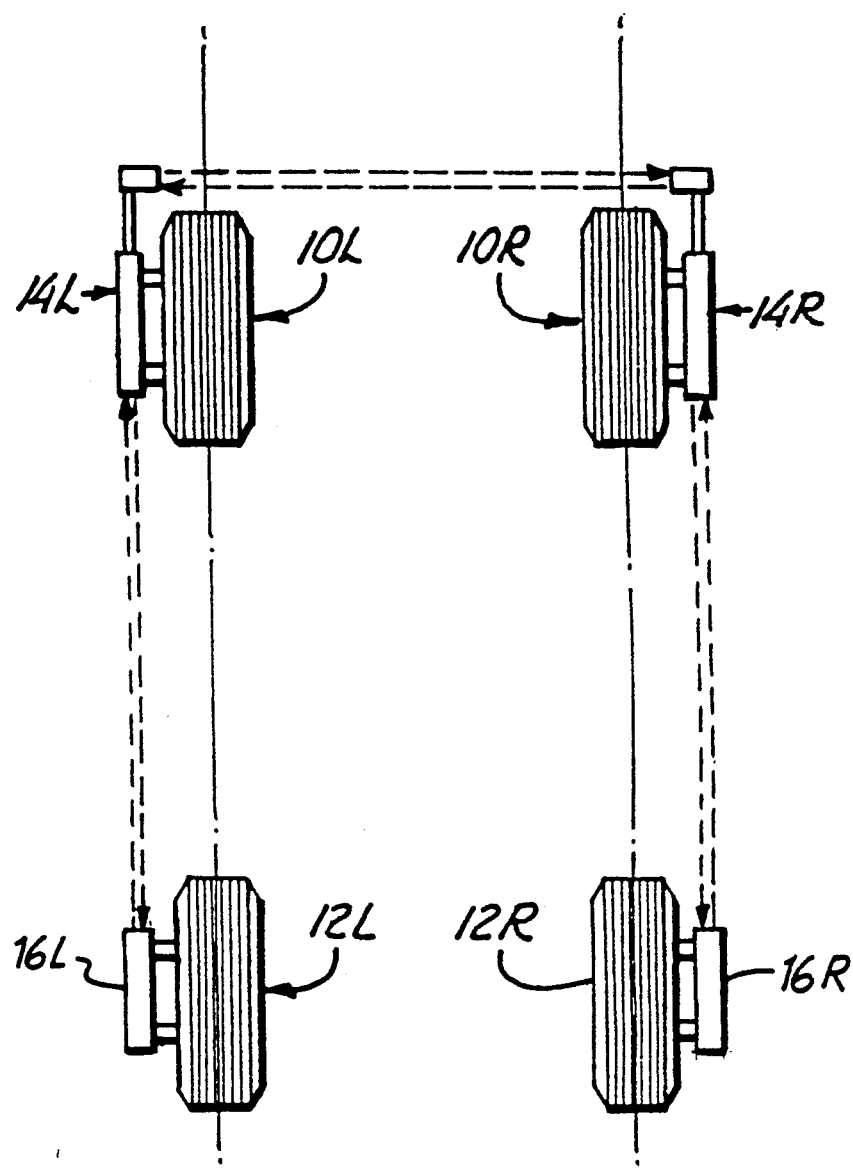
FIG. 1 shows head units mounted to wheels of an automotive vehicle.

FIG. 1 shows left front wheel 10L, right front wheel 10R, left rear wheel 12L, and right rear wheel 12R of the automotive vehicle. Front head unit 14L is mounted to left front wheel 10L. Right front head unit 14R is mounted on right front wheel 10R. Left rear head unit 16L is mounted to left rear wheel 12L and right rear head unit 16R is mounted to right rear wheel 12R.

Head units 14L, 14R, 16L, and 16R provide angle measurements for wheels 10L, 10R, 12L, and 12R of an automotive vehicle. Each head unit includes radiation emitters and sensors. Radiation paths are indicated by dashed lines in FIG. 1. The radiation emitters and sensors are used to detect relative angles between adjacent pairs of head units. U.S. Pat. No. 4,594,789 entitled WHEEL ALIGNMENT SYSTEM by Marino et al describes such an alignment system and is incorporated herein by reference. Head units 14L and 14R also contain pitch (inclination) angle sensors for measuring the pitch of the head units relative to a horizontal plane.

Figure 2A:
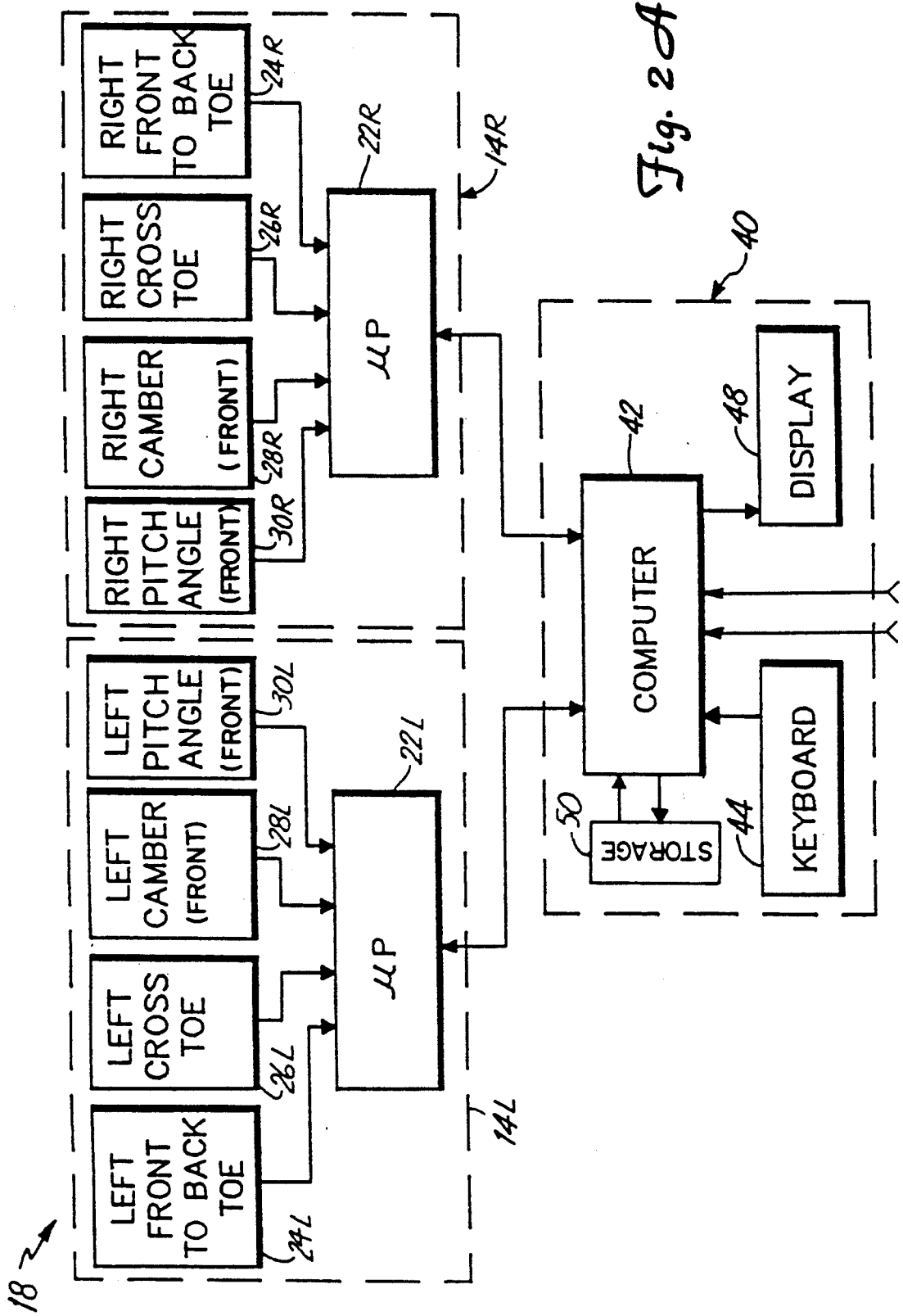
FIGS. 2A and 2B is a block diagram of a wheel alignment system in accordance with the present invention.
Figure 2B:
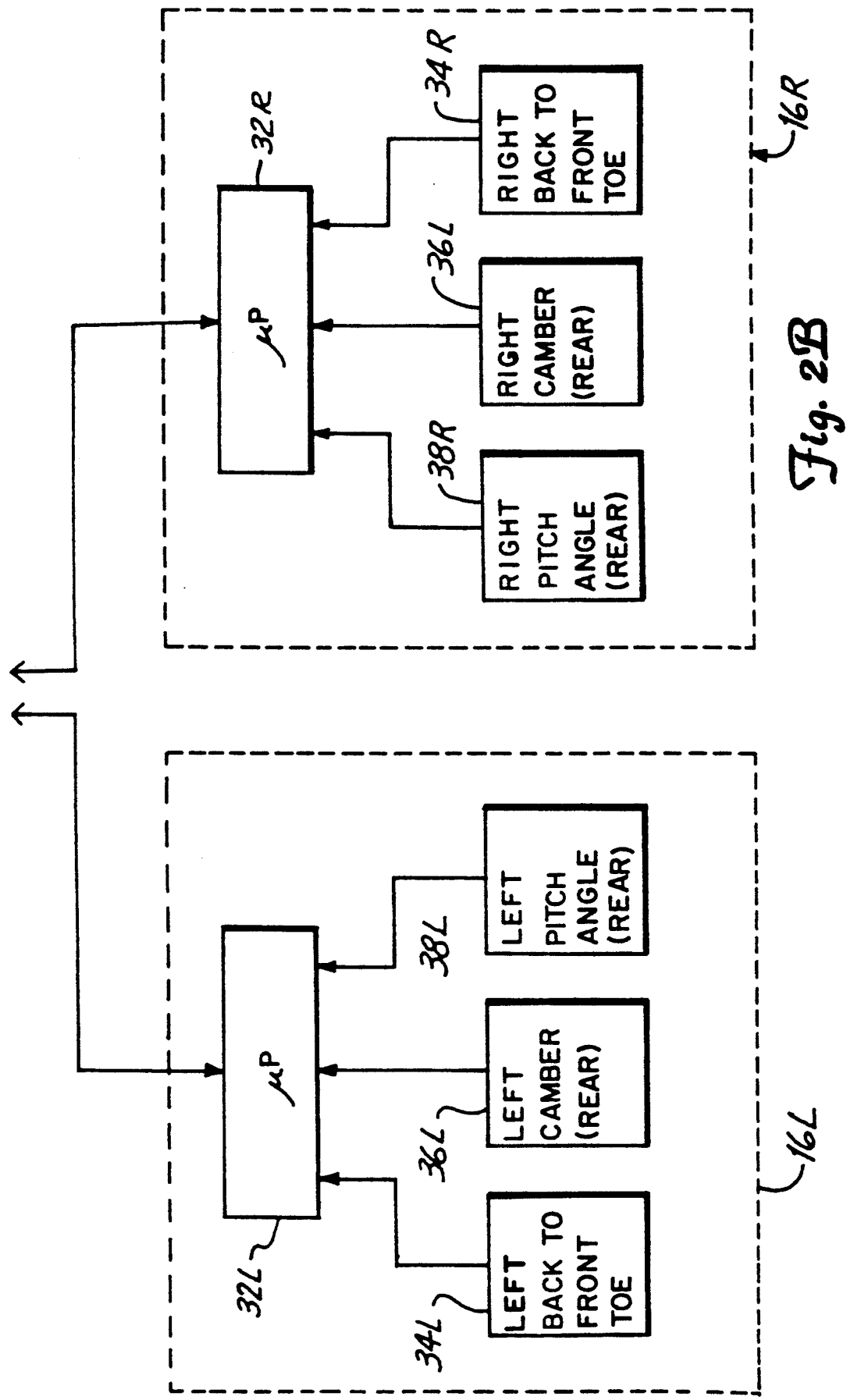

FIG. 2 is a block diagram of a wheel alignment system 18 in accordance with the present invention. Wheel alignment system 18 includes front head units 14L and 14R and rear head units 16L and 16R. Left rear unit 14L includes microprocessor 22L, left front-to-back toe sensor 24L, left cross toe sensor 26L, left camber (front) sensor 28L, and left pitch angle (front) sensor 30L. Sensors 24L, 26L, 28L, and 30L are connected to microprocessor 22L. Right front head unit 14R include microprocessor 22R, right front-to-back toe sensor 24R, right cross toe sensor 26R, right camber (front) sensor 28R, and right pitch angle (front) sensor 30R. Sensors 24R, 26R, 28R, and 30R are connected to microprocessor 22R.

Left rear head unit 16L includes microprocessor 32L, left back-to-front toe sensor 34L, left camber (rear) sensor 36L, and left pitch angle (rear) sensor 38L. Sensors 34L, 36L, and 38L are coupled to microprocessor 32L. Right read head units 16R includes microprocessor 32R, right back-to-front toe sensor 34R, right camber (rear) sensor 36R, and right pitch angle (rear) sensor 38R. Sensors 34R, 36R, and 38R are coupled to microprocessor 32R.

Wheel alignment, system 18 includes main console 40. Main console 40 houses computer 42, keyboard 44, and display 48. A storage device 50 is connected to computer 42.

Computer 42 receives commands and input data from keyboard 44 and provides information and instructions to automotive service technicians through display 48. Computer 42 also receives measurement data from microprocessors 22L, 22R, 32L, and 32R. Sensors 24L-30L, 24R-30R, 34L-38L, and 34R-38R provide digital output signals through an analog-to-digital converter (not shown). Microprocessors 22L, 22R, 32L, and 32R receive sensor signals from their associated sensors and process those signals as needed before sending the signals to computer 42 for further analysis.

It has been discovered that crosstalk can arise between measurements from camber angle sensors and pitch angle sensors. Crosstalk can introduce an error in SAI, toe, caster, and camber angle measurements. Crosstalk arises because the camber and pitch sensors are not mounted perfectly square with the wheel units due to mechanical tolerances. This causes an angle to appear in an opposite axis. In other words, a change in pitch angle can cause the camber angle reading to change. Similarly, a change in camber angle can cause the pitch angle reading to change.

Figure 3:
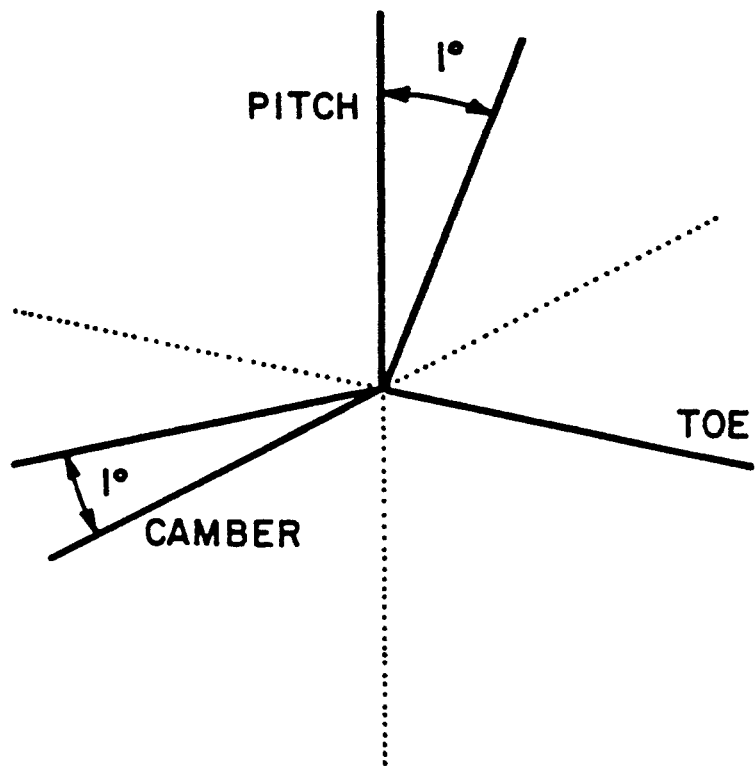
FIG. 3 is a diagram of pitch and camber angles of a wheel of an automotive vehicle.

FIG. 3 is a diagram of pitch, toe, and camber angles. FIG. 3 shows an example of crosstalk between pitch angle and camber angle. For example, assume that a sensor output has a "gain" of 100 counts per degree (i.e. the analog-to-digital output of the sensor changes by 100 for every degree that the sensor is tilted) and that the crosstalk (the change in output for an opposite axis over a known span) is ten counts per degree for both pitch and camber sensors. Assuming that the head unit is tilted one degree in both the pitch axis and the camber axis, the orientation will be as shown in FIG. 3.

The crosstalk between the two angles will cause the pitch sensor and the camber sensor to read 110 counts, which is ten counts from the correct reading. Therefore, to accurately calculate camber and pitch angles, it is necessary to eliminate the error introduced by crosstalk. True camber and read (measured) camber are related as shown in the following equation:

Equation 1:

$$True\_camber - Read\_camber - camber\_crosstalk * (True\_pitch / pitch\_gain)$$

True pitch and read (measured) pitch are related by the following equation:

Equation 2:

$$True\_pitch - Read\_pitch - pitch\_crosstalk * (True\_camber / camber\_gain)$$

In the above formulas, the two unknowns are True\_camber and True\_pitch. Solving equations 1 and 2 for these unknowns yields:

Equation 3:

$$True\_camber = \frac{Read\_camber - camber\_crosstalk * (read\_pitch / pitch\_gain)}{1 - [(camber\_crosstalk * pitch\_crosstalk) / (camber\_gain * pitch\_gain)]}$$

Equation 4:

$$True\_pitch = \frac{Read\_pitch - pitch\_crosstalk * (read\_camber / camber\_gain)}{1 - [(camber\_crosstalk * pitch\_crosstalk) / (camber\_gain * pitch\_gain)]}$$

In Equations 1 through 4, camber\_crosstalk and pitch\_crosstalk are calibration factors which are calculated for each head unit. These calibration factors can be measured during manufacturer and stored in microprocessors 22L, 22R, 32L, and 32R for use during operation. Camber\_crosstalk is measured by taking a first camber reading at a first pitch angle and taking a second camber reading at a second pitch angle which is a fixed, specific offset from the first pitch angle. Pitch\_crosstalk is calculated using a similar procedure in which camber is changed by the same specific offset. These crosstalk compensation values are approximately linear over the range in which they will be used. Camber\_gain and pitch\_gain represent the gain of the camber and pitch sensors respectively. Camber\_gain and pitch\_gain can be measured when the head unit it calibrated during manufacture. Camber\_crosstalk, pitch\_crosstalk, camber\_gain, and pitch\_gain values are typically stored in the microprocessors of each head unit.

Figure 4:
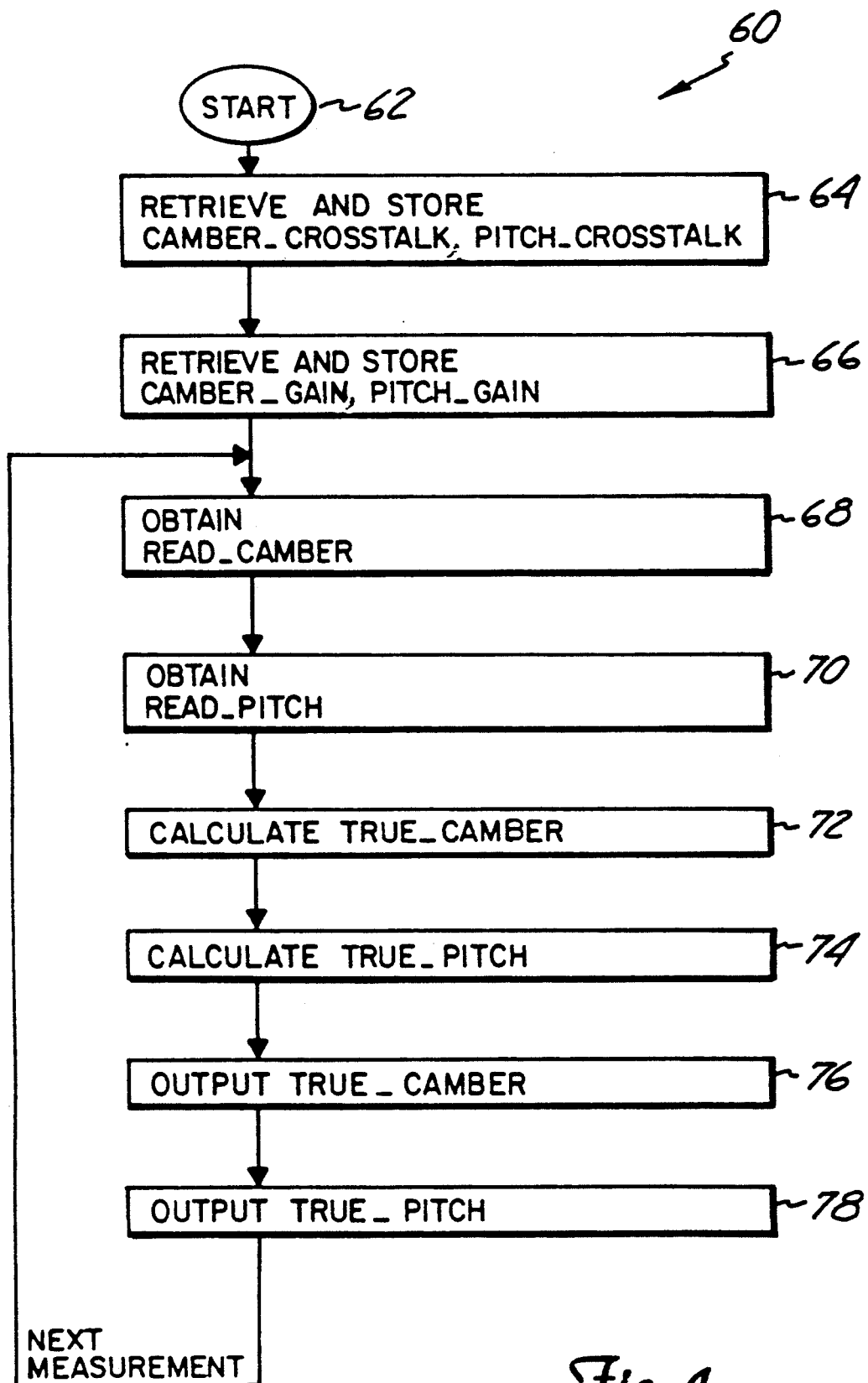
FIG. 4 is a flow chart in accordance with the present invention.

FIG. 4 is a block diagram 60 in accordance with the present invention. Calculation of true\_camber and true\_pitch is initiated as block 62 labeled START. Start block 62 passes control to block 64. Camber\_crosstalk and pitch\_crosstalk are retrieved at block 64. These values may be stored in microprocessors 22L, 22R, 32L, or 32R and are obtained during calibration of the head unit. At block 66, camber\_gain and pitch\_gain are retrieved from storage. Again, these values may be stored in microprocessors 22L, 22R, 32L, or 32R for the particular head unit. These values may be obtained during manufacture of the head unit during which time the head units are calibrated. At block 68 read\_camber value is obtained. Similarly, pitch angle is obtained from the head unit at block 70. Pitch and camber angles are obtained from the appropriate sensors in head unit 14L, 14R, 16L, or 16R.

Once read\_camber, read\_pitch, camber\_gain, pitch\_gain, camber\_crosstalk, and pitch\_crosstalk are obtained, the true\_camber and the true\_pitch values can be calculated using Equations 3 and 4, above. At block 72, true\_camber is calculated using Equation 3. At block 74, true\_pitch is calculated using Equation 4. These calculations are performed by microprocessors 22L, 22R, 32L, 32R, or computer 42. Once true\_camber and true\_pitch are calculated in block 72 and 74 of FIG. 4 using Equations 3 and 4, these values are available to computer 42 for subsequent use. For example, at block 76 computer 42 outputs the true\_camber value on display 48. Similarly, at block 78, computer 42 outputs the true\_pitch value to display 48. The procedure is repeated and control is returned to block 68.

In addition to outputting true\_camber and true\_pitch values on display 48, these values can be used in subsequent calculations of caster, steering axis inclination (SAI), and toe angle. Computer 42 can instruct an operator through display 48 on how to adjust a wheel of an automotive vehicle to compensate for misalignment in steering axis inclination (SAI), toe, camber, or caster angles to obtain proper wheel alignment. Using the present invention, an operator can align the wheels of an automobile with greater accuracy. Specifically, errors which arise due to crosstalk between opposite angles are eliminated. This is accomplished by obtaining true_pitch and true_camber angles using gain and crosstalk calibration values measured for a specific head unit. Once these values are measured and stored in the system of the present invention, they can be used to modify measured pitch and measured camber angles and thereby eliminate errors in these angles caused by crosstalk.

The wheel alignment system of the present invention improves accuracy of measured angles by eliminating crosstalk sensor. In the present invention, true camber and true pitch are calculated by measuring read camber and read pitch which are corrected based upon camber crosstalk and pitch crosstalk values.

Although the present invention has been described with reference to preferred embodiments, workers skilled in the art will recognize that changes may be made in form and detail without departing from the spirit and scope of the invention.

What is claimed is:

1. A method of aligning wheels of a vehicle, the vehicle having two front steerable wheels and two back wheels, the method comprising:

mounting head units to the two front steerable wheels and the two back wheels of the vehicle;

obtaining read_camber measurements from each of the head units mounted to the two front steerable wheels of the vehicle;

obtaining read_pitch measurements from each head unit mounted to the two front steerable wheels of the vehicle;

retrieving camber_crosstalk values for each of the head units mounted to the two front steerable wheels of the vehicle;

retrieving pitch_crosstalk values for each of the head units mounted to the two front steerable wheels of the vehicle;

calculating true_camber for each of the head units mounted to the two front steerable wheels of the vehicle based upon read_camber, read_pitch, and camber_crosstalk for each of the head units mounted to the two front steerable wheels of the vehicle;

calculating true_pitch for each of the head units mounted to the two front steerable wheels of the vehicle based upon read_camber, read_pitch, and pitch_crosstalk for each of the head units mounted to the two front steerable wheels of the vehicle; and aligning the wheels of the vehicle using true_camber and true_pitch of the front two steerable wheels of the vehicle.

2. The method of claim 1 including retrieving a camber_gain value and a pitch_gain value for each of the head units mounted to the two front steerable wheels of the vehicle.

3. The method of claim 2 wherein calculating true_camber comprises calculating true_camber based upon the formula:

$$\text{True\_camber} = \frac{\text{Read\_camber} - \text{camber\_crosstalk}*(\text{read\_pitch}/\text{pitch\_gain})}{1 - [(\text{camber\_crosstalk}*\text{pitch\_crosstalk})/(\text{camber\_gain}*\text{pitch\_gain})]}.$$

4. The method of claim 2 wherein calculating true_pitch comprises calculating true_pitch based upon the formula:

$$\text{True\_pitch} = \frac{\text{Read\_pitch} - \text{pitch\_crosstalk}*(\text{read\_camber}/\text{camber\_gain})}{1 - [(\text{camber\_crosstalk}*\text{pitch\_crosstalk})/(\text{camber\_gain}*\text{pitch\_gain})]}.$$

5. A method for accurately measuring true_camber and true_pitch of a wheel of an automotive vehicle, the method comprising:

mounting a head unit on a wheel of the automotive vehicle;

obtaining a read_camber measurement for the wheel of the automotive vehicle from a camber sensor in the head unit;

obtaining a read_pitch measurement for the head unit of the automotive vehicle from a pitch sensor in the head unit;

retrieving a camber_crosstalk value for the head unit;

retrieving a pitch_crosstalk value for the head unit;

calculating true_camber of the wheel of the automotive vehicle based upon read_camber, read_pitch and the camber_crosstalk value; and calculating true_pitch of the head unit of the automotive vehicle based upon read_pitch, read_camber, and the pitch_crosstalk value.

6. The method of claim 5 including adjusting alignment of the wheel based upon true_camber and true_pitch.

7. The method of claim 5 including retrieving a camber_gain value and a pitch_gain value for the head unit.

8. The method of claim 7 wherein calculating true_camber comprises calculating true_camber based upon the formula:

$$\text{True\_camber} = \frac{\text{Read\_camber} - \text{camber\_crosstalk}*(\text{read\_pitch}/\text{pitch\_gain})}{1 - [(\text{camber\_crosstalk}*\text{pitch\_crosstalk})/(\text{camber\_gain}*\text{pitch\_gain})]}.$$

9. The method of claim 7 wherein calculating true_pitch comprising calculating true_pitch based upon the formula:

$$\text{True\_pitch} = \frac{\text{Read\_pitch} - \text{pitch\_crosstalk}*(\text{read\_camber}/\text{camber\_gain})}{1 - [(\text{camber\_crosstalk}*\text{pitch\_crosstalk})/(\text{camber\_gain}*\text{pitch\_gain})]}.$$

10. An apparatus for aligning a wheel of an automotive vehicle, comprising:

a head unit coupled to the wheel of the automotive vehicle;

means for measuring camber angle of the wheel and providing a read_camber output;

means for measuring pitch angle of the head unit and providing a read_pitch output;

means for retrieving camber_crosstalk for the head unit;

means for retrieving pitch_crosstalk for the head unit;

means for calculating true_camber of the wheel of the automotive vehicle based upon read_camber, read_pitch, and camber_crosstalk;

means for calculating true_pitch of the head unit based upon read_camber, read_pitch, and pitch_crosstalk; and means for providing outputs based upon true_camber and true_pitch.

11. The apparatus of claim 10 including
means for retrieving camber_gain for the head unit; and
means for retrieving pitch_gain for the head unit.

12. The apparatus of claim 10 wherein the means for calculating true_camber comprises means for calculating true_camber using the formula:

$$\text{True\_camber} = \frac{\text{Read\_camber} - \text{camber\_crosstalk}*(\text{read\_pitch}/\text{pitch\_gain})}{1 - [(\text{camber\_crosstalk}*\text{pitch\_crosstalk})/(\text{camber\_gain}*\text{pitch\_gain})]}.$$

13. The apparatus of claim 10 wherein the means for calculating true_pitch comprises means for calculating true_pitch using the formula:

$$\text{True\_pitch} = \frac{\text{Read\_pitch} - \text{pitch\_crosstalk}*(\text{read\_camber}/\text{camber\_gain})}{1 - [(\text{camber\_crosstalk}*\text{pitch\_crosstalk})/(\text{camber\_gain}*\text{pitch\_gain})]}.$$

14. An apparatus for measuring true_camber in an automotive vehicle wheel alignment system, comprising:

a head unit coupled to a wheel of the automotive vehicle;

means for measuring camber angle of the wheel and providing a read_camber output;

means for measuring pitch angle of the head unit and providing a read_pitch output;

means for calculating true_camber of the wheel of the automotive vehicle based upon read_camber, read_pitch and a camber_crosstalk value; and means for providing an output based upon true_camber.

15. An apparatus for measuring true_pitch of a head unit coupled to a wheel of an automotive vehicle in an automotive vehicle wheel alignment system, comprising:

a head unit coupled to the wheel of the automotive vehicle;

means for measuring camber angle of the wheel and providing a read_camber output;

means for measuring pitch angle of the head unit and providing a read_pitch output;

means for calculating true_pitch of the wheel of the automotive vehicle based upon read_pitch, read_camber and a pitch_crosstalk value; and means for providing an output based upon true_pitch.

* * * * *

UNITED STATES PATENT AND TRADEMARK OFFICE
CERTIFICATE OF CORRECTION

PATENT NO. : 5,329,452

DATED : July 12, 1994

INVENTOR(S) : GARY R. KERCHECK, PETER A. PEUTZ

It is certified that error appears in the above-indentified patent and that said Letters Patent is hereby corrected as shown below:

On the Title Page of the Patent, delete [75] Inventors:     Gary R. Kercheck, Milwaukee;
Peter A. Peutz, Waukesha, both of Wis.

insert [75] Inventors:     Gary R. Kercheck, Milwaukee;
Peter A. Puetz, Waukesha, both of Wis.

Col. 2, line 43, delete "et al", insert --et al.--

Col. 3, line 52, delete "camber-Read", insert --camber = Read--

Col. 3, line 58, delete "pitch - Read", insert --pitch = Read--

Col. 4, line 1, delete "(read", insert --(Read--

Col. 4, line 10, delete "(read", insert --(Read--

Col. 4, line 18, delete "manufacturer", insert --manufacture--

Col. 4, line 30, delete "unit it", insert --unit is--

Col. 6, line 4, delete "(read", insert --(Read--

Col. 6, line 14, delete "(read", insert --(Read--

Col. 6, line 51, delete "(read", insert --(Read--

Col. 6, line 61, delete "(read", insert --(Read--

Col. 7, line 30, delete "(read", insert --(Read--

Col. 8, line 4, delete "(read", insert --(Read--

UNITED STATES PATENT AND TRADEMARK OFFICE
CERTIFICATE OF CORRECTION

PATENT NO. : 5,329,452
DATED : July 12, 1994
INVENTOR(S) : Gary R. Kercheck, et al.

It is certified that error appears in the above-indentified patent and that said Letters Patent is hereby corrected as shown below:

Column 8, line 4, delete "(read", insert --(Read--

Signed and Sealed this

Third Day of January, 1995

Attest:

BRUCE LEHMAN

*Attesting Officer*     *Commissioner of Patents and Trademarks*